United States Patent
Shibao

(10) Patent No.: US 7,482,569 B2
(45) Date of Patent: Jan. 27, 2009

(54) INTEGRATED CIRCUIT DEVICE, MICROCOMPUTER, AND MONITORING CAMERA SYSTEM

(75) Inventor: Kazuyuki Shibao, Souka (JP)

(73) Assignee: Seiko Epson Corporation, Tokyo (JP)

( * ) Notice: Subject to any disclaimer, the term of this patent is extended or adjusted under 35 U.S.C. 154(b) by 291 days.

(21) Appl. No.: 11/408,002

(22) Filed: Apr. 21, 2006

(65) Prior Publication Data
US 2006/0255241 A1 Nov. 16, 2006

(30) Foreign Application Priority Data
May 16, 2005 (JP) ............................. 2005-142779

(51) Int. Cl.
*H01L 27/00* (2006.01)
*H04N 7/18* (2006.01)
(52) U.S. Cl. .................... 250/208.1; 348/154
(58) Field of Classification Search ............. 250/208.1; 348/152, 153, 154
See application file for complete search history.

(56) References Cited

U.S. PATENT DOCUMENTS

| | | | | |
|---|---|---|---|---|
| 5,471,239 A | * | 11/1995 | Hill et al. .................. 348/155 |
| 5,581,297 A | * | 12/1996 | Koz et al. .................. 348/152 |
| 5,956,424 A | * | 9/1999 | Wootton et al. ............ 382/192 |
| 6,069,655 A | * | 5/2000 | Seeley et al. ............... 348/154 |
| 6,097,429 A | * | 8/2000 | Seeley et al. ............... 348/154 |
| 6,480,225 B1 | * | 11/2002 | Kim .......................... 348/143 |
| 6,618,074 B1 | * | 9/2003 | Seeley et al. ............... 348/143 |
| 7,272,179 B2 | * | 9/2007 | Siemens et al. ....... 375/240.01 |
| 7,280,673 B2 | * | 10/2007 | Buehler et al. ............. 382/103 |

FOREIGN PATENT DOCUMENTS

JP A 2004-282163 10/2004

OTHER PUBLICATIONS

U.S. Appl. No. 11/223,678, filed Sep. 9, 2005, Shibao.

* cited by examiner

*Primary Examiner*—John R Lee
(74) *Attorney, Agent, or Firm*—Oliff & Berridge, PLC

(57) ABSTRACT

An integrated circuit device having a transmitter function for transmitting data to outside through a network. The integrated circuit device includes: an image change detection circuit which receives pixel-unit image data captured by imaging means in time series, sets one or more areas in an image represented by the image data, and detects in real time whether or not a change has occurred in the image in units of the areas to generate a change detection signal; and a destination set/change section which sets or changes a destination of the image based on the change detection signal.

19 Claims, 12 Drawing Sheets

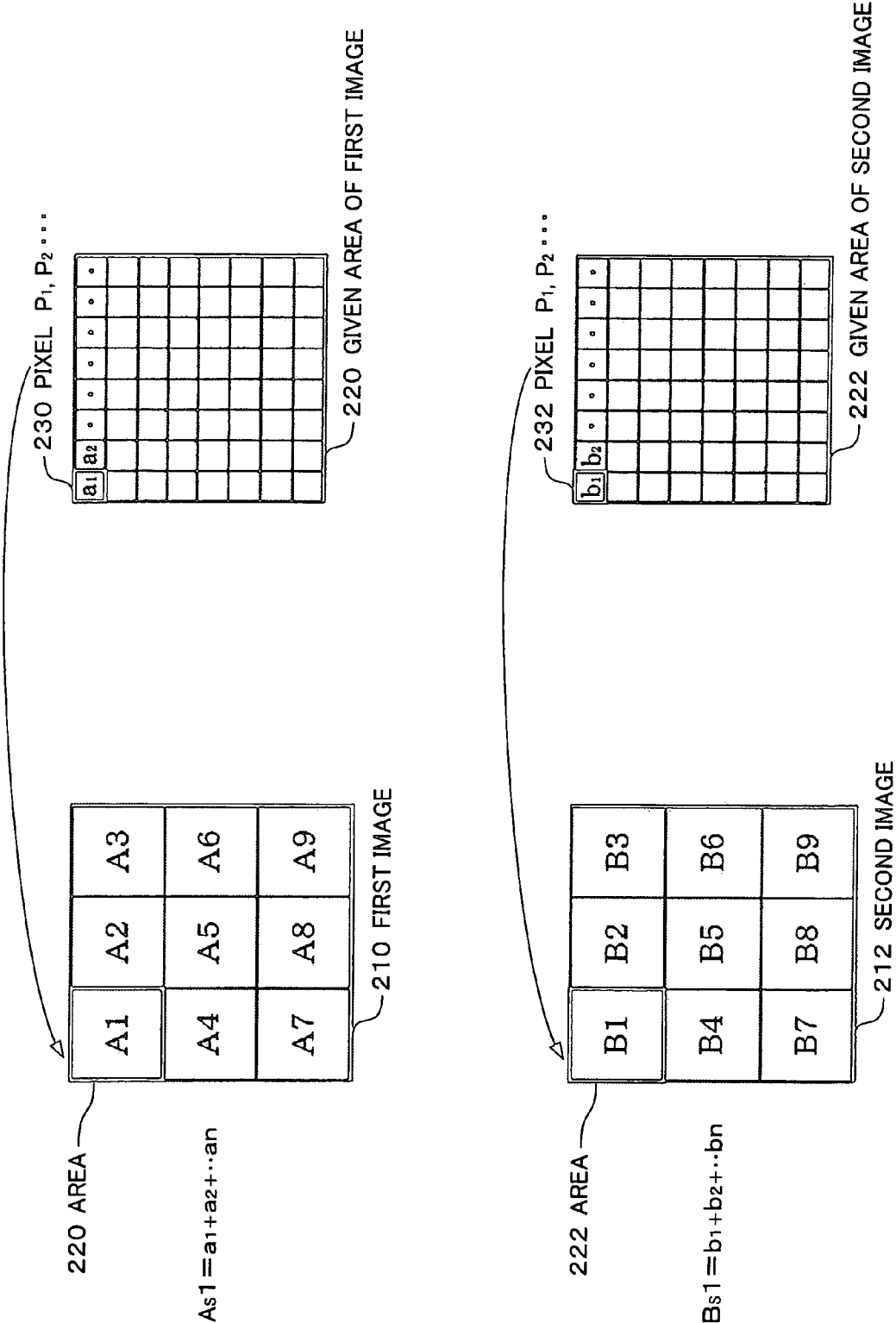

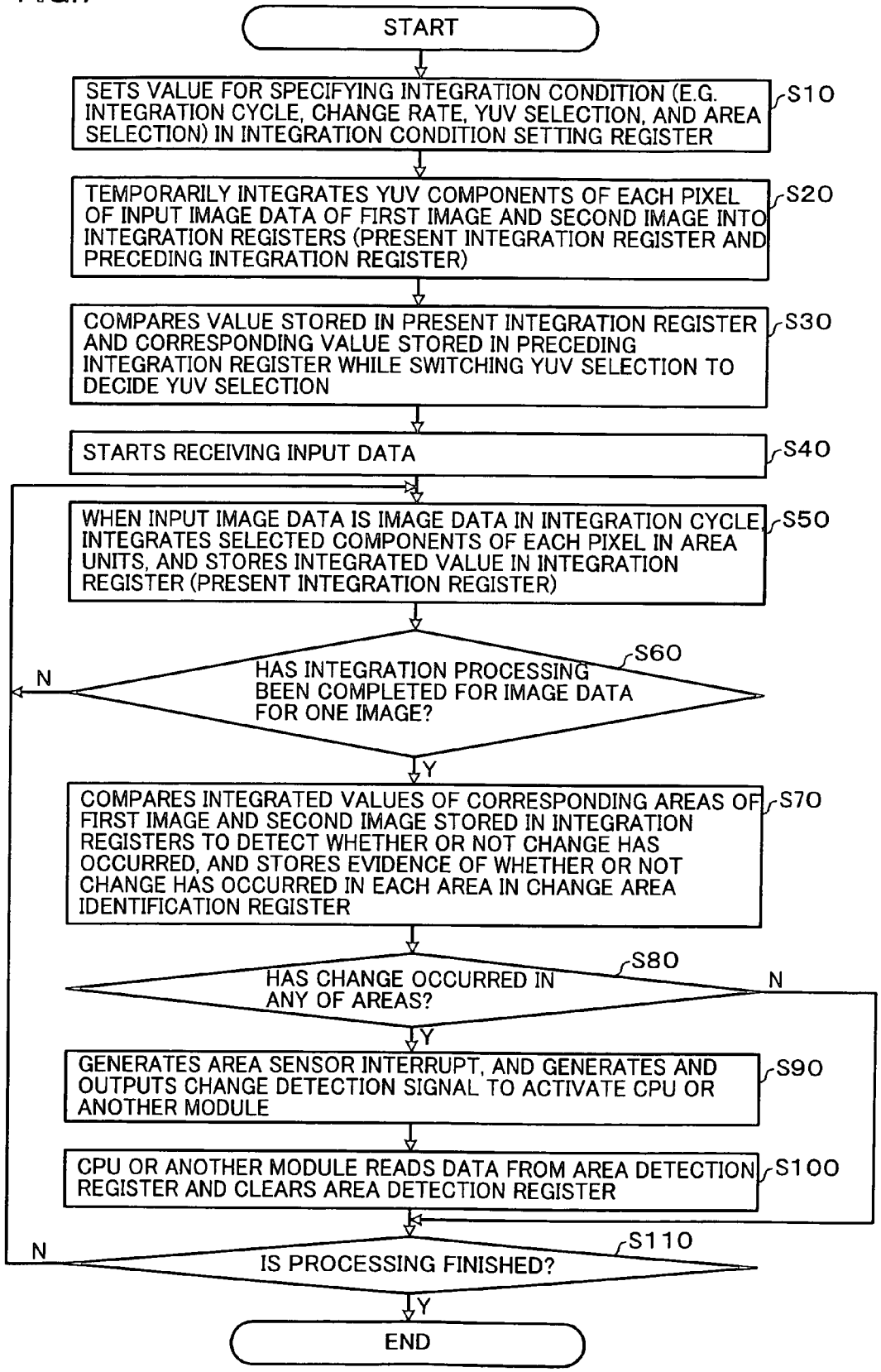

FIG.9A
INTEGRATION CYCLE: 1/20 SEC
FIG.9B
INTEGRATION CYCLE: 1/60 SEC
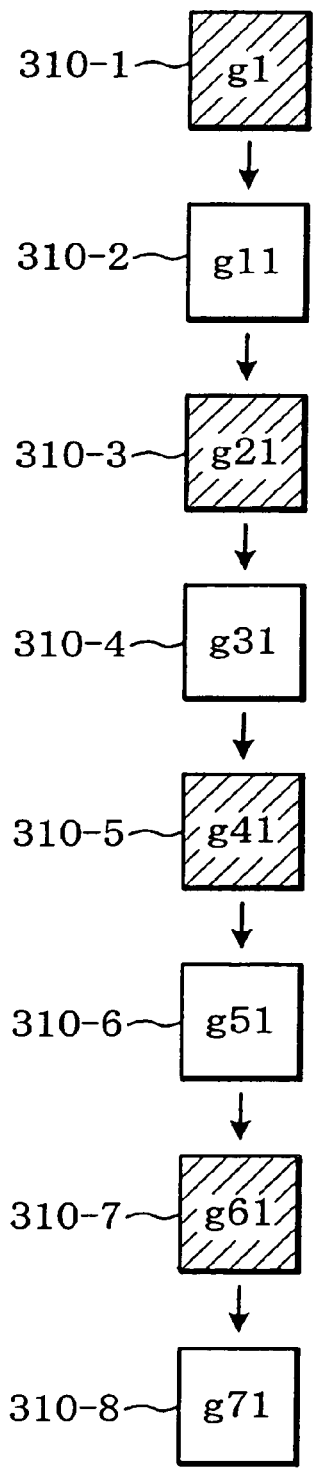
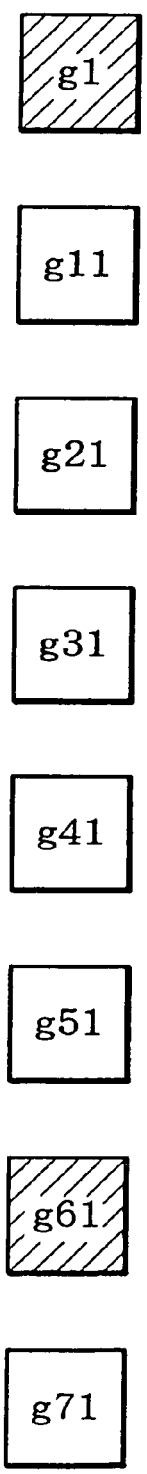

INTEGRATED CIRCUIT DEVICE, MICROCOMPUTER, AND MONITORING CAMERA SYSTEM

Japanese Patent Application No. 2005-142779, filed on May 16, 2005, is hereby incorporated by reference in its entirety.

BACKGROUND OF THE INVENTION

The present invention relates to an integrated circuit device, a microcomputer, and a monitoring camera system.

In a monitoring camera system used for a security system, a monitoring camera captures an image of a monitoring target area. A change between frames is detected by image processing, and an image is stored when a change has occurred at a certain level.

JP-A-2004-282163 discloses related-art technology in this technical field.

In the case of acquiring an image only when a change has occurred between successive images captured by a stationary camera or the like, a change must be detected using a CPU, a personal computer (PC) or an analog thermosensor connected to the monitoring camera system, or the like.

When detecting a change using a CPU or PC, an image is processed after storing the image in a frame buffer. Therefore, the load imposed on the CPU or memory is increased, and power consumption is also increased.

On the other hand, use of an analog thermosensor results in increased cost due to the necessity of expensive parts.

According to the related-art technology, since it takes time to detect a change, the image acquisition area cannot be dynamically changed. Therefore, the destinations of successive images cannot be changed in real time corresponding to whether or not a change has been detected or the area in which a change has been detected.

SUMMARY

According to a first aspect of the invention, there is provided an integrated circuit device having a transmitter function for transmitting data to outside through a network, the integrated circuit device comprising;

an image change detection circuit which receives pixel-unit image data captured by imaging means in time series, sets one or more areas in an image represented by the image data, and detects in real time whether or not a change has occurred in the image in units of the areas to generate a change detection signal; and a destination set/change section which sets or changes a destination of the image based on the change detection signal.

According to a second aspect of the invention, there is provided a microcomputer, comprising the above-described integrated circuit device.

According to a third aspect of the invention, there is provided a monitoring camera system having a monitoring camera device which includes the above-described microcomputer and an imaging device, and a plurality of terminals connected to the monitoring camera device through a network, wherein the monitoring camera device sets one or more areas in an image captured by the imaging device, determines a destination terminal, a size and a position of the image based on at least either whether or not a change of the image has occurred or in which of the areas a change of the image has been detected, acquires the image based on the determined size and position, compresses the acquired image, and transmits the compressed image to the determined destination terminal through the network.

BRIEF DESCRIPTION OF THE SEVERAL VIEWS OF THE DRAWING

FIG. 6 is a diagram illustrative of integration of pixel values in area units according to one embodiment of the invention.

FIG. 7 is a flowchart illustrative of an example of image change detection processing according to one embodiment of the invention.

FIGS. 9A and 9B are diagrams illustrative of an integration cycle according to one embodiment of the invention.

DETAILED DESCRIPTION OF THE EMBODIMENT

Figure 1:
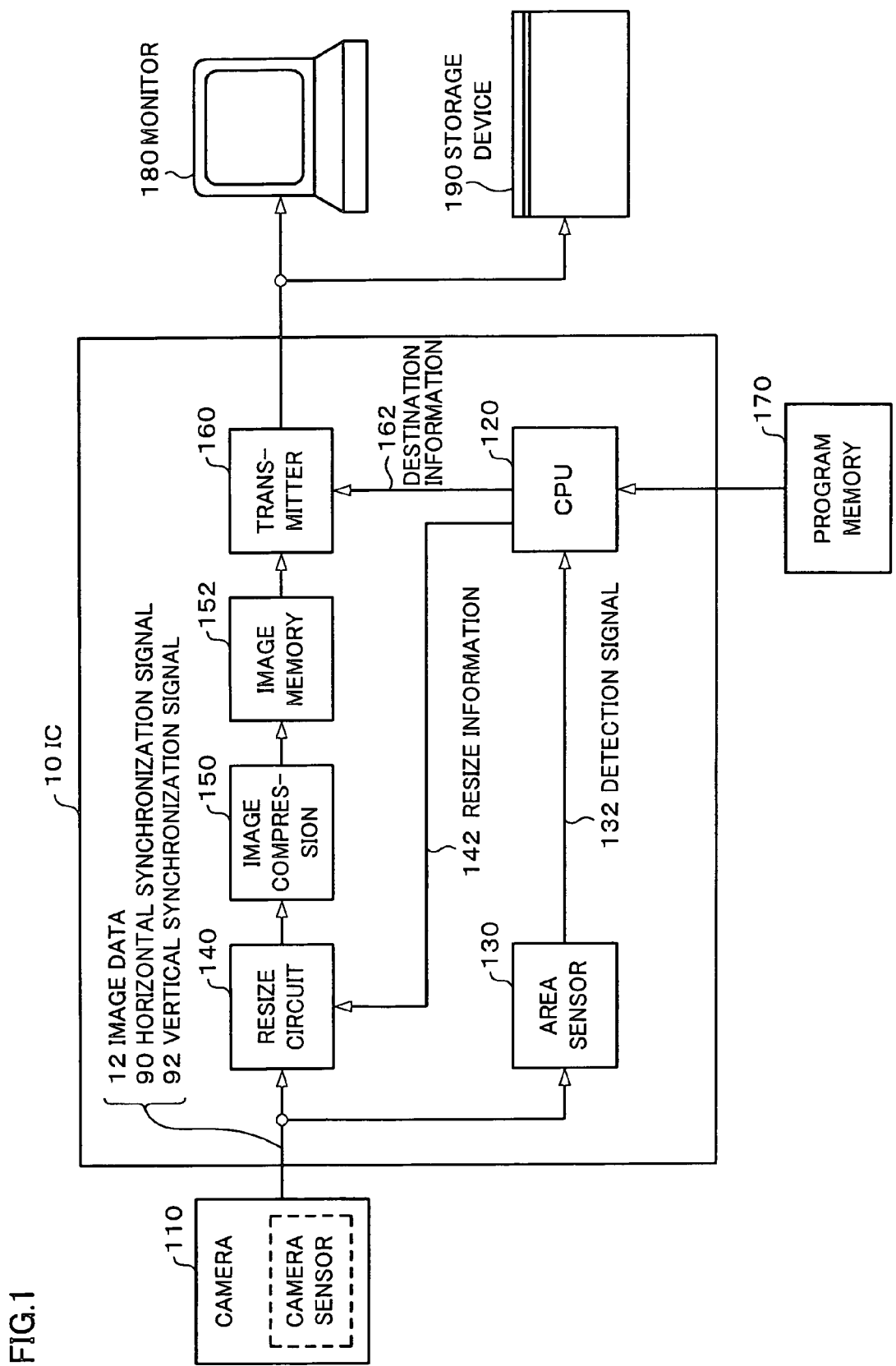
FIG. 1 is a block diagram of an integrated circuit device according to one embodiment of the invention.

The invention may provide an integrated circuit device capable of changing the destinations of successive images in real time corresponding to whether or not a change has been detected or the area in which a change has been detected, a microcomputer, and a monitoring camera system.

(1) According to one embodiment of the invention, there is provided an integrated circuit device having a transmitter function for transmitting data to outside through a network, the integrated circuit device comprising:

an image change detection circuit which receives pixel-unit image data captured by imaging means in time series, sets one or more areas in an image represented by the image data, and detects in real time whether or not a change has occurred in the image in units of the areas to generate a change detection signal; and a destination set/change section which sets or changes a destination of the image based on the change detection signal.

The expression "in real time" used herein includes detecting a change in synchronization with a vertical synchronization signal (VSYNC), for example. Therefore, the expression "in real time" does not include a configuration in which the received image data is stored in a work area and a change is detected by comparing the image data read from the work area.

The image data used herein refers to pixel-unit YUV data, RGB data, and the like, and may include a vertical synchronization signal (VSYNC) and a horizontal synchronization signal (HSYNC).

The destination of the image may be set or changed in units of one or more images.

The change detection signal used herein includes information indicating whether or not a change has occurred in area units. The destination of the image may be set or changed based on the change detection signal using a configuration in which the destination of the image is changed when a change has been detected in one area (configuration in which the destination is changed corresponding to whether or not a change has occurred), or a configuration in which the destination is determined corresponding to the area in which a change has occurred.

A plurality of destination addresses may be registered in advance as the destination of the image data, and the destination address may be selected (set/changed) from the registered destination addresses. An IP address or the like may be used as the destination address. For example, a definition table containing the detection target area and the destination may be provided, and an IP address defined corresponding to the detection target area in which a change has occurred may be set as the destination.

According to this embodiment, the images can be transmitted to different IP addresses on a LAN.

Since the compression image acquisition range can be changed corresponding to the area in which a change has been detected by the image change detection circuit, an increase in the amount of data can be prevented by acquiring only the necessary area (area in which a change has occurred).

Since whether or not a change has occurred in two or more areas can be detected using one camera, it is unnecessary to provide cameras in area units.

(2) In this integrated circuit device, the destination set/change section may set a first destination as the destination of the image when the change detection signal indicates that a change of the image has not been detected in any of the areas, and set a second destination differing from the first destination as the destination of the image when the change detection signal indicates that a change of the image has been detected in at least one of the areas.

For example, the image may be transmitted to a first terminal (e.g. monitor) when a change has not occurred in the image, and, when a change has occurred in the image, the image may be selectively transmitted to the first terminal (e.g. monitor) or a second terminal (e.g. storage device) in image units. This allows the image to be stored in the second terminal (e.g. storage device) only when a change has occurred in the image.

(3) In this integrated circuit device, the destination set/change section may assign a destination address to successively acquired images according to a given rule, determine the assigned destination address as the destination of the image when a change of the image has been detected in at least one of the areas, and determine a default destination address provided in advance as the destination of the image when a change of the image has not been detected in any of the areas.

The given rule used herein may include the case where one of the destination addresses provided in advance is assigned to the successively acquired images in turn or alternately in a specific cycle, and the case where the destination addresses provided in advance are assigned to the successively acquired images at random.

For example, the destination may be set at the monitor device when a change has not occurred, and the destination address may be set at the address of either the monitor device or the storage device according to the given rule when a change has occurred.

For example, when data of "n" images is input per second (n is a natural number), a change is continuously detected for a specific period (at least one second). Therefore, when a change is detected for "m" seconds, a change has occurred in "m×n" images (m is a natural number). In this case, the destination addresses are assigned to the "m×n" images according to the given rule.

(4) The integrated circuit device may comprise:

a resize information determination section which determines resize information indicating at least one of a transmitted data size and a transmitter position based on the change detection signal or the destination of the image set or changed based on the change detection signal; and a resize circuit which scales down or cuts out the image represented by the pixel-unit image data received in time series, based on the resize information.

The statement "determines the resize information based on the change detection signal" may include the case where the resize information is determined depending on whether or not a change has occurred and the case where the resize information is determined depending on the area in which a change has occurred, for example. If the resize information is determined based on the destination, the resize information can be set corresponding to the application of the destination (e.g. whether to display the image on the monitor or store the image in the storage section).

In general, it is desirable to transmit the entire image to the monitor device. Therefore, when the destination is the monitor device, the resize information may be set so that the original image is directly transmitted to the monitor device, or the resize information may be set so that the original image is reduced in size (data thinning) and transmitted to the monitor device in order to reduce the amount of data.

On the other hand, it is desirable to transmit to the storage device the detailed image of the area in which a change has occurred. Therefore, when the destination is the storage device, the resize information may be set so that the area in which a change has occurred is cut from the original image and transmitted to the storage device without reducing the size of the image.

(5) In this integrated circuit device, the resize information determination section may generate the resize information which directs to scale down the image represented by the pixel-unit image data received in time series when the change detection signal indicates that a change of the image has not occurred in any of the areas; and the resize circuit may scale down the image represented by the pixel unit image data received in time series, based on the resize information.

Since the image is compressed after reducing the size of the image when a change has not occurred, the amount of data is reduced, whereby the image can be transmitted at high speed.

Since the detailed image is rarely required when a change has not occurred, a problem rarely occurs due to a reduction in size.

(6) In this integrated circuit device, when the change detection signal indicates that a change has occurred in the image represented by the pixel-unit image data received in time series, the resize information determination section may generate the resize information which directs to cut out at least one of the areas in which the change of the image has been detected; and the resize circuit may cut out at least one of the areas in which the change of the image has been detected, based on the resize information.

Since the area in which a change has occurred is cut out and then compressed, the amount of data is reduced, whereby the image can be transmitted at high speed.

Moreover, since the image is not reduced in size, an image having the same resolution as that of the original image can be provided when the detailed image is required.

(7) According to one embodiment of the invention, there is provided a microcomputer, comprising the above-described integrated circuit device.

(8) According to one embodiment of the invention, there is provided a monitoring camera system having a monitoring camera device which includes the above-described microcomputer and an imaging device, and a plurality of terminals connected to the monitoring camera device through a network, wherein the monitoring camera device sets one or more areas in an image captured by the imaging device, determines a destination terminal, a size and a position of the image based on at least either whether or not a change of the image has occurred or in which of the areas a change of the image has been detected, acquires the image based on the determined size and position, compresses the acquired image, and transmits the compressed image to the determined destination terminal through the network.

(9) In this integrated circuit device, the image change detection circuit may include:

an integration circuit which sets one or more areas in an image, integrates pixel values of pixels belonging to each area of image data of a first image and a second image received in time series in area units, and holds the resulting integrated values in integration registers; and a change detection signal generation circuit which compares the integrated values of corresponding areas of the first image and the second image held in the integration registers to detect whether or not a change has occurred, and generates the change detection signal when the change detection signal generation circuit has determined that a change has occurred.

The pixel value may be received in the YUV format, the RGB format, the YCbCr format, or another format (luminance and color difference), for example. The integration target may be the value of one component of each pixel value (e.g. luminance component or color difference component). The integration target may be predetermined higher-order bits of the value of one component.

The first image and the second image as the comparison targets are video images or the like captured by the imaging means such as a CCD camera and received in time series. The pixel values of all of the received images may be integrated to detect whether or not a change has occurred, or the pixel values may be integrated in a predetermined integration cycle (e.g. at intervals of "m" frames).

A CPU or another module may be notified of whether or not a change has occurred using the change detection signal as a change detection interrupt signal output to the CPU or another module, for example.

Since the image change detection circuit can receive the image data from the imaging means in real time and detect a change, it suffices that the memory capacity and the memory load be small in comparison with the case where the image data is stored in a frame buffer and the CPU or a PC reads the image data from the frame buffer and performs the change detection processing. Moreover, power consumption can be reduced.

In this embodiment, a change occurring in the image captured by the imaging means can be detected at reduced cost and power consumption using a small storage capacity.

(10) In this integrated circuit device, the integration circuit may divide an image into a plurality of areas, integrate pixel values of pixels belonging to each area of the image data of the first image and the second image received in time series in area units, and hold the resulting integrated values in the integration registers; and the change detection signal generation circuit may compare the integrated values of corresponding areas of the first image and the second image held in the integration registers to detect whether or not a change has occurred, and generate the change detection signal when the change detection signal generation circuit has determined that a change has occurred.

A change (e.g. change in contrast) can be detected in area units. Therefore, since the change moving direction can be determined by reading the areas in which a change has been detected in time series, simple movement detection can also be performed.

Since a change can be detected in area units, a partial movement can also be detected.

Moreover, the change detection sensitivity can be changed by changing the number of area divisions (changing the size of each area). For example, the change detection sensitivity can be increased by increasing the number of area divisions (reducing the size of each area).

(11) In this integrated circuit device, the image change detection circuit may include a change area identification register; and the change detection signal generation circuit may compare the integrated values of each corresponding area of the first image and the second image retained in the integration registers to detect whether or not a change has occurred, and hold evidence of whether or not a change has occurred in each area in the change area identification register.

The change area identification register is a register for storing change detection results in area units, and may be configured so that the position of each bit is associated with the area and whether or not a change has occurred can be detected by whether each bit is ON or OFF (value "1" or "0").

This enables a CPU or another module to detect the area in which a change has occurred by referring to the change area identification register.

(12) In this integrated circuit device, the image change detection circuit may divide an image into two or more quadrilateral areas, and detect a change in units of the quadrilateral areas.

The identification processing of the area to which the pixel belongs and the change position detection are facilitated by dividing the image into quadrilateral areas.

Since the sensitivity and the position detection accuracy are increased by increasing the number of area divisions, it is preferable to set the area division depending on the objective.

(13) In this integrated circuit device, the image change detection circuit may include an integration cycle setting register for setting conditions relating to an integration cycle; and the integration circuit may specify the integration cycle based on a value set in the integration cycle setting register, determine whether or not the received image data coincides with the specified integration cycle, integrate the pixel values of the image data which coincides with the integration cycle, and hold the integrated value in the integration register.

The image pick-up cycle for change detection can be changed by altering the value set in the integration cycle setting register. A quick change can be detected by reducing the integration cycle, and a slow change can be detected by increasing the integration cycle. Therefore, it is preferable to set the area division depending on the objective.

The value stored in the integration cycle setting register may be the integration cycle or a value which can specify the integration cycle (e.g. value which can be uniquely associated with a predetermined integration cycle).

In this embodiment, it is possible to deal with detection of a quick or slow change by changing the value set in the integration cycle setting register.

(14) In this integrated circuit device, the image change detection circuit may include a reference change rate setting register in which a condition relating to a reference change rate used as a reference when detecting a change is set; and the change detection signal generation circuit may specify the reference change rate based on the value set in the reference change rate setting register, compare the integrated values of corresponding areas of the first image and the second image held in the integration registers, and detect whether or not a change has occurred based on the reference change rate.

The degree of change of the change target can be altered by changing the value set in the reference change rate setting register. The reference change rate may be expressed by the ratio of the amount of change with respect to the preceding integrated value, such as "(present integrated value−preceding integrated value)/preceding integrated value", for example. Since the detection accuracy sensitivity is increased by decreasing the value of the reference change rate in comparison with the case where the reference change rate is large, it is preferable to adjust the area division setting depending on the objective.

The value stored in the reference change rate setting register may be the reference change rate or a value which can specify the reference change rate (e.g. value which can be uniquely associated with a predetermined reference change rate).

(15) In this integrated circuit device, the image change detection circuit may include an area identification information setting register for setting area identification information which is a condition for specifying a change detection target area; and the change detection signal generation circuit may determine whether or not the area is the detection target area based on a value set in the area identification information setting register, and may not generate the change detection signal when the area is not the detection target area.

The CPU or the like can be notified of a change only when a change has occurred in the detection target area. There may be a case where it is unnecessary to detect a change occurring in a certain area depending on the imaging conditions since the image is always changed in this area. According to this embodiment, since change detection of such an area can be masked, it is possible to efficiently detect a change occurring in a particular area.

(16) In this integrated circuit device, the image change detection circuit may include an integration component identification information setting register for setting integration component identification information for specifying the integration target component of the pixel values; and the integration circuit may select the pixel component based on the value set in the integration component identification information setting register, and integrate the selected pixel components of the image data.

A pixel value is generally made up of two or more components. For example, a YUV pixel value includes a Y component, a U component, and a V component.

In this embodiment, it is possible to set or change the component used using the integration component identification information setting register.

Therefore, it is preferable to set a component optimum for change detection corresponding to the imaging conditions, the environment, and the imaging target.

The value stored in the integration component identification information setting register may be the integration component identification information or a value which can specify the integration component identification information (e.g. value which can be uniquely associated with predetermined integration component identification information).

(17) In this integrated circuit device, the integration circuit may receive a horizontal synchronization signal and a vertical synchronization signal, specify the area to which each pixel belongs based on the received horizontal synchronization signal and vertical synchronization signal and a number of horizontal divisions and a number of vertical divisions, and integrate the pixel value of each pixel in the integration register corresponding to the specified area.

(18) In this integrated circuit device, the integration circuit may integrate values of high-order bits of the image data of each pixel value.

This reduces the hardware scale of the integration circuit and the integration register.

(19) In this integrated circuit device, the image change detection circuit may divide an image into "m" areas in a horizontal direction and "n" areas in a vertical direction to provide "n×m" divided areas, and include "m×n" present integration registers and "m×n" preceding integration registers corresponding to the "m×n" areas (n and m are natural numbers); and after the integration circuit has stored the integrated value of the image data of the second image received after the image data of the first image in the present integration register, the comparison circuit may compare the integrated value held in the present integration register with the corresponding integrated value held in the preceding integration register in which the integrated value of the image data of the first image is held to detect whether or not a change has occurred, and transfer the integrated value held in the present integration register to the preceding integration register after the comparison.

(20) In this integrated circuit device, the image change detection circuit may divide an image into "m" areas in a horizontal direction and "n" areas in a vertical direction to provide "n×m" divided areas, and include "m" present integration registers corresponding to the "m" areas in the horizontal direction and "m×n" preceding integration registers corresponding to the "m×n" areas (n and m are natural numbers); and after the integration circuit has stored the integrated value of the image data of the second image received after the image data of the first image in the present integration register, the comparison circuit may compare the integrated value held in the present integration register with the corresponding integrated value held in the preceding integration register in which the integrated value of the image data of the first image is held to detect whether or not a change has occurred, and transfer the integrated value held in the present integration register to the preceding integration register after the comparison.

This enables the number of second registers to be reduced to the number of divisions in the horizontal direction, whereby the hardware scale can be reduced.

These embodiments of the invention will be described in detail below, with reference to the drawings. Note that the embodiments described below do not in any way limit the scope of the invention laid out in the claims herein. In addition, not all of the elements of the embodiments described below should be taken as essential requirements of the invention.

FIG. 1 is a block diagram of an integrated circuit device according to one embodiment of the invention.

An integrated circuit device 10 according to this embodiment is an integrated circuit device having a transmitter function for transmitting data to the outside through a network, and includes a CPU 120, an area sensor 130, a resize circuit 140, an image compression section 150, an image memory 152, a transmitter section 160, and the like.

The area sensor 130 functions as an image change detection circuit which receives pixel-unit image data (e.g. YUV data 12, RGB data, horizontal synchronization signal (HSYNC) 90, vertical synchronization signal (VSYNC) 92, and the like) captured by an external camera (imaging means) 110 in time series, detects whether or not a change has occurred in the image in area units in real time (in synchronization with the vertical synchronization signal VSYNC), and generates a change detection signal 133 (signal indicating whether or not a change has occurred in the image in area units).

The CPU 120 executes various instructions stored in an external program memory 170, for example. The CPU 120 functions as a destination set/change section which sets or changes the destination of image data (compressed image data) based on the detection signal 132 output from the area sensor 130, and notifies the transmitter section 160 of destination information 162. In this embodiment, two or more destination addresses are registered as the destination of image data. The CPU sets one of the registered addresses as the destination address, and notifies the transmitter section 160 of the destination information 162.

The CPU 120 may set a first destination as the destination of an image for which the change detection signal 132 indicates that a change has not been detected in each area, and may set a destination other than the first destination as the destination of an image for which the change detection signal 132 indicates that a change has been detected in one area.

The CPU 120 may assign the destination addresses to successively acquired images according to a given rule, may determine the destination address assigned according to the given rule as the destination when a change has been detected in one area, may determine a default destination address provided in advance as the destination when a change has not been detected in each area, and may notify the transmitter section 160 of the destination information 162.

The CPU 120 also functions as a resize information determination section which determines resize information 142 including at least one of the transmitted data size and the transmitter position based on the change detection signal 132 or the destination set or changed based on the change detection signal. The resize circuit 140 is notified of the determined resize information 142.

The resize circuit 140 receives pixel-unit image data captured by the camera (imaging means) 110 in time series, scales down or cuts out the pixel-unit image data received in time series based on the resize information 142, and outputs the resized data to the image compression section 150. For example, when the resize information indicates that it is unnecessary to scale down or cut out the image data, the resize circuit 140 outputs the received image data (image data of the original image) to the image compression section 150 without resizing the image data.

The image compression section 150 encodes the resized image data to generate a compressed image (JPEG/MPEG image), and outputs the compressed image to the image memory 152. The image memory 152 is a memory which can store image data of at least one image, and is formed by a rewritable memory such as a RAM or an SRAM.

The transmitter section 160 transmits the compressed image data to a destination terminal (e.g. monitor 180 or storage device 190) through a network based on the destination information 162.

Figure 2:
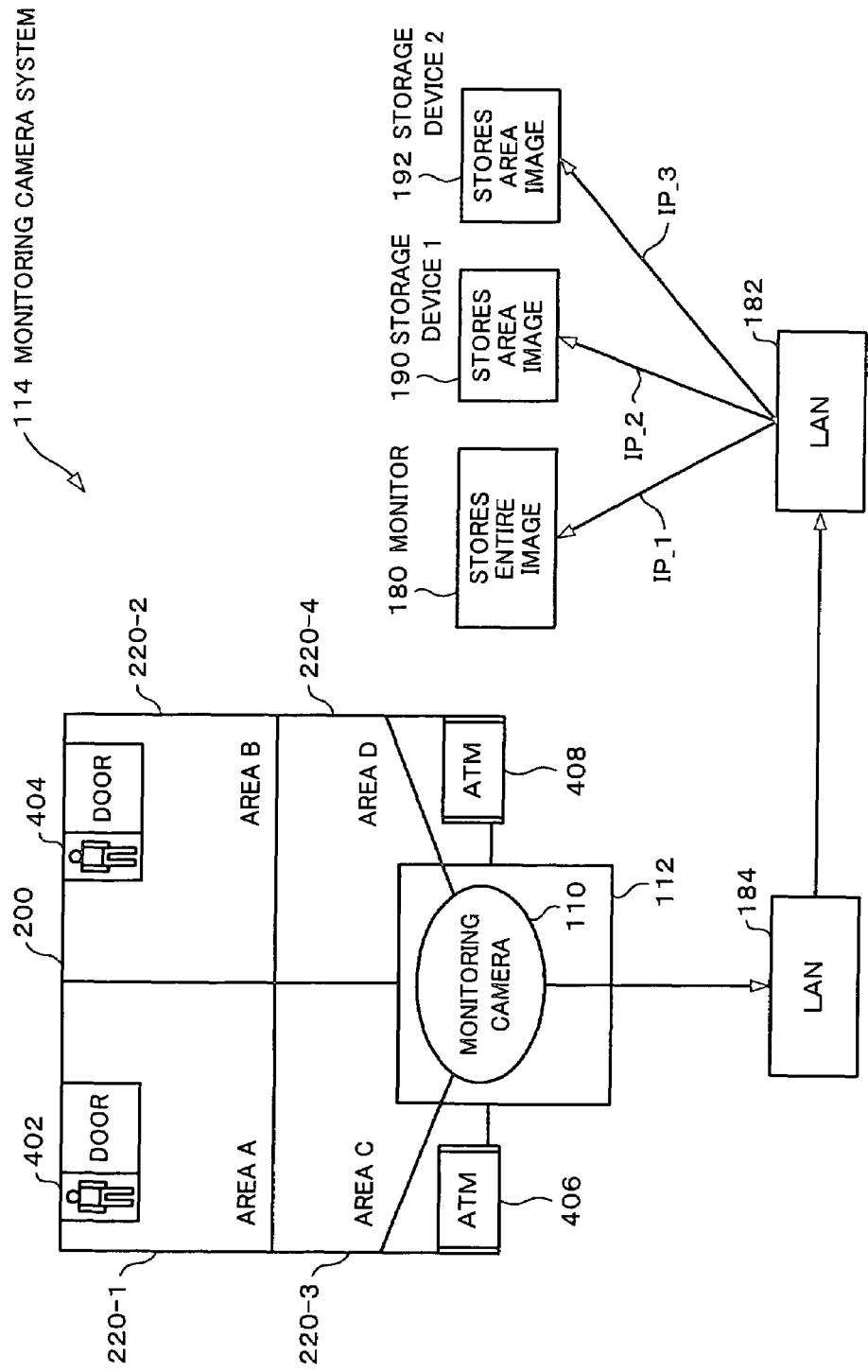
FIG. 2 is an example of a monitoring camera system according to one embodiment of the invention.

FIG. 2 is a diagram illustrative of an example of a monitoring camera system according to this embodiment.

A monitoring camera system 114 according to this embodiment includes a monitoring camera device 112, a plurality of terminals (monitor 180, storage device 1 (190), and storage device 2 (192)) to which image data is distributed from the monitoring camera device 112, and the like. The monitoring camera device 112, the terminals, and the like are connected through a network such as LANs 182 and 184.

The monitoring camera device 112 includes the integrated circuit device 10 (e.g. integrated circuit device shown in FIG. 1) according to this embodiment, and a monitoring camera 110 which captures a digital image.

An area 200 schematically indicates the range of an image acquired by the monitoring camera 110. The monitoring camera 110 successively captures an image in the range including two ATMs 406 and 408 and two doors 402 and 404, for example. The monitoring camera 110 may capture a video image or may successively capture still images at specific intervals, for example.

The integrated circuit device 10 receives pixel-unit image data captured by the monitoring camera 110 in time series, and detects whether or not a change has occurred in the image in area units in real time.

In FIG. 2, the IP addresses of the monitor 180 (IP address is "IP-1"), the storage device 1 (IP address is "IP-2") 190, and the storage device 2 (IP address is "IP-3") 192 are set as the destinations of the image.

The monitor 180 displays the image received through the network (e.g. LAN 182). The storage device 1 (190) and the storage device 2 (190) respectively store the image received through the network (e.g. LAN 182) in storage sections.

In this embodiment, the successively acquired image data is distributed to the monitor 180, the storage device 1 (190), or the storage device 2 (192). For example, the image data may be distributed while changing the destination according to a given rule (e.g. the image data may be alternately distributed to the monitor 180, the storage device 1 (190), and the storage device 2 (192) in units of a specific number of images).

The image data may be transmitted to the destination (storage device 1 (190) or storage device 2 (192)) assigned according to a given rule when the area sensor has detected a change, and may be transmitted to the default destination (monitor 180) when the area sensor has not detected a change.

The entire image 200 may be transmitted to the monitor 180, and the image of the area in which a change has been detected may be transmitted to the storage device 1 (190) and the storage device 2 (192). For example, the image may be transmitted to the storage device 1 (190) when a change has been detected in the area A or C, and may be transmitted to the storage device 2 (192) when a change has been detected in the area B or D.

When a change has been detected in the area A, the area A may be cut out from the entire image, and the image of the area A may be transmitted instead of transmitting the entire image. When a change has been detected in two or more areas, the areas may be cut out and transmitted in a specific order, or the entire image may be transmitted. Since the size of the image to be transmitted is reduced by ¼ when cutting out and transmitting one of the areas, the amount of image data can be correspondingly reduced.

When transmitting the entire image, the entire image may be compressed and transmitted without changing the image size, or may be transmitted after resizing (reducing) the image by ¼, for example. In the latter case, since the size of the image to be transmitted is reduced by ¼, the amount of image data can be correspondingly reduced.

The resize information which directs scaling down of the original image may be generated when the change detection signal indicates that a change has not occurred, the pixel-unit image data received in time series may be scaled down based on the resize information, and the resulting image data may be transmitted. This reduces the amount of data to be transmitted. Since the image data is merely output to the monitor when a change has not occurred, a problem does not occur even if the resolution of the image is decreased to some extent due to scaling down.

The resize information, which directs cutting out of the area in which a change has been detected from the original image, may be generated when the change detection signal indicates that a change has occurred, and the pixel-unit image data received in time series may be processed based on the resize information so that the area in which a change has been detected is cut out from the original image and transmitted. It is desirable that the detailed image of the area in which a change has occurred be available. Therefore, the amount of data to be transmitted can be reduced by cutting out and transmitting that area.

According to the invention, a compressed image can be generated while changing the image acquisition position corresponding to the area in which a change has been detected, and the compressed image can be transmitted to an arbitrary terminal. Moreover, the compressed image can be transmitted to the destination terminal address which can be changed corresponding to the area in which a change has been detected. It is also possible to alternately transmit the entire image and the area image.

According to this embodiment, the range including the four areas can be captured by one camera using a wide-angle lens or a high-resolution camera, whereby the number of monitoring cameras can be reduced. Moreover, the entire image and the area image can be transmitted to different addresses. Since the area image can be transmitted to the storage device and stored in the storage section only when a change has occurred in the image, the image in which a change has occurred can be stored in a small-capacity storage section.

Since the area sensor can detect a change in each area of the image input from the imaging means in real time, the entire image and the area image to be acquired can be switched at high speed.

The scaled-down entire image may be acquired when a change has not occurred, and, when a change has occurred, the area image obtained by cutting out the area in which the change has occurred may be acquired, and a timestamp (ym-dhms) may be inserted in the compressed image, for example.

This allows a change to be searched for using the entire image and to be confirmed using the detailed area image by referring to the time.

The entire image may be transmitted during the normal operation, and, only when a change has been detected, the area image in which the change has occurred may be transmitted in addition to the entire image. Or, the entire image and the area image in which a change has occurred may be transmitted only when a change has occurred.

The above-described embodiment illustrates an example in which three terminals including the monitor (IP address is "IP-1") 180, the storage device 1 (IP address is "IP-2") 190, and the storage device 2 (IP address is "IP-3") 192 are set as the destinations of the image. Note that the invention is not limited thereto. For example, two terminals may be set as the destinations of the image, or four or more terminals may be set as the destinations of the image. Or, only two or more monitor devices may be set as the destinations of the image, or only two or more storage devices may be set as the destinations of the image.

Figure 3:
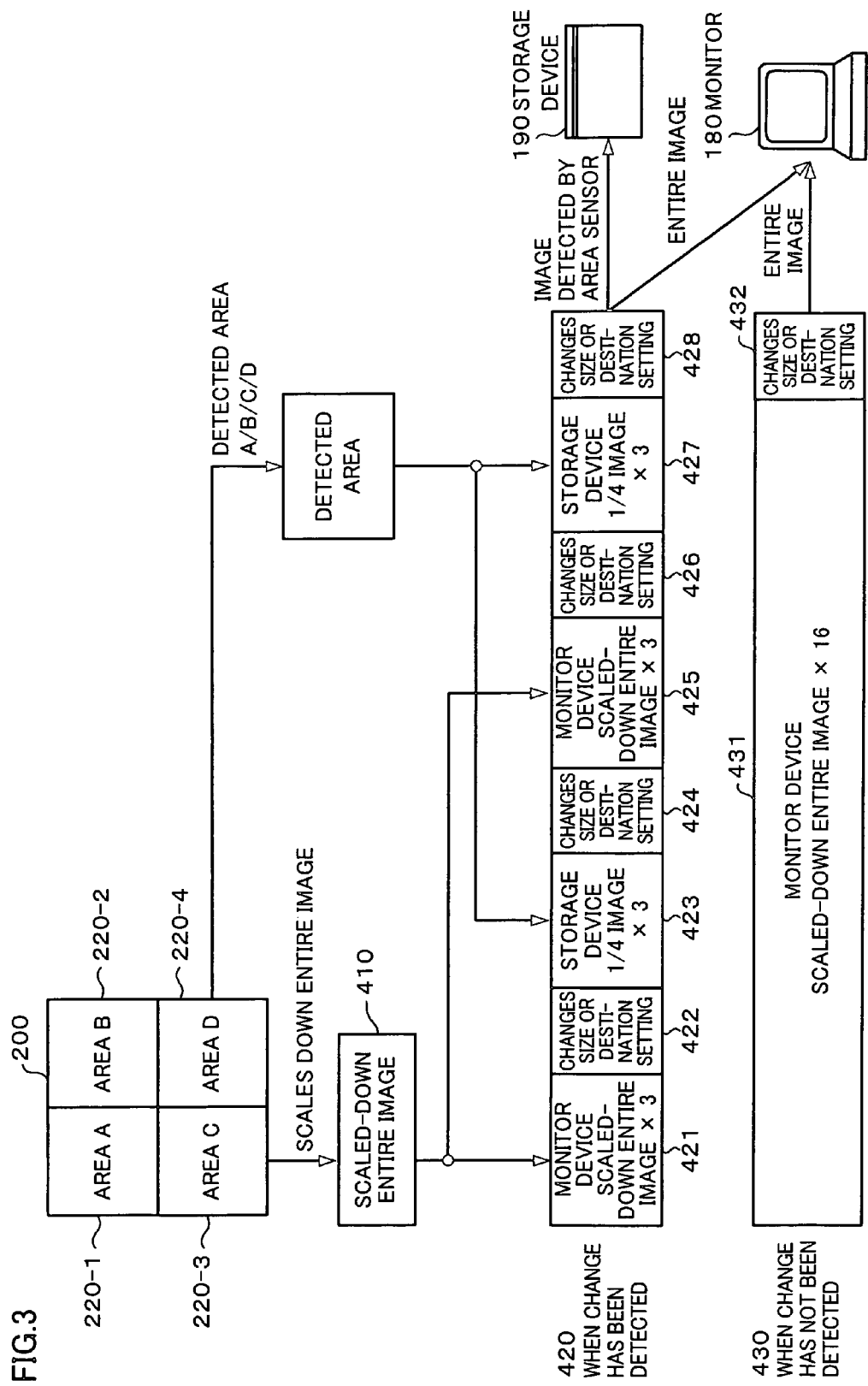
FIG. 3 is a diagram illustrative of an example of image data distribution.

FIG. 3 is a diagram illustrative of an example of the image data distribution of the integrated circuit device according to this embodiment.

FIG. 3 shows the case where sixteen images are input per second.

The size (resolution) of the entire image 200 captured by the camera is "1280×960". Reference numerals 220-1 to 220-4 respectively indicate the areas A to D obtained by dividing the entire image by four, and the size of the image in each area is "640×480". In this embodiment, a compressed image is generated by scaling down the entire image to "320×240" (¹⁄₁₆ the original image). The area in which a change has been detected is cut out in area units (¼ the original image), and a compressed image thereof is generated. Therefore, the amount of data can be reduced in comparison with the case of compressing the image without reducing the size of the image.

In this embodiment, the destinations of successively acquired images are alternately assigned to the monitor and the storage device in units of three images, as indicated by reference numerals 421 to 428. Compressed image data generated by compressing the scaled-down entire image is transmitted to the monitor 180 (421 and 422), and compressed image data generated by compressing the cut-out area image is transmitted to the storage device 190 (423 and 427).

When changing the size setting or the destination, an overhead (loss) for one image occurs as indicated by the reference numerals 422, 424, 426, and 428. Therefore, since the number of images lost is increased if the size setting or the destination is changed in a short cycle, it is preferable to set an appropriate cycle size taking the number of images lost into consideration. In this embodiment, it is assumed that an overhead for one image occurs when changing the size setting or the destination. Note that it is unnecessary to change the size setting or the destination depending on the control method or the integrated circuit device.

In the case where the area sensor has detected a change in two or more areas (e.g. the area sensor has detected a change in all the areas) in the cycle 423 or 427 in which the storage device is set as the destination, the areas A, B, . . . may be cut out from the successively input images in that order when generating one scaled-down image from one original image.

In the case where the image is transmitted to the storage device only when the area sensor has detected a change, as indicated by a reference numeral 430, the received image is transmitted to the monitor device when the area sensor has not detected a change.

For example, the first destination (monitor) mat be set as the destination when the area sensor has not detected a change, and the first destination (monitor) and the second destination (storage device) may be alternately set as the destination at specific intervals when the area sensor has detected a change.

Figure 4:
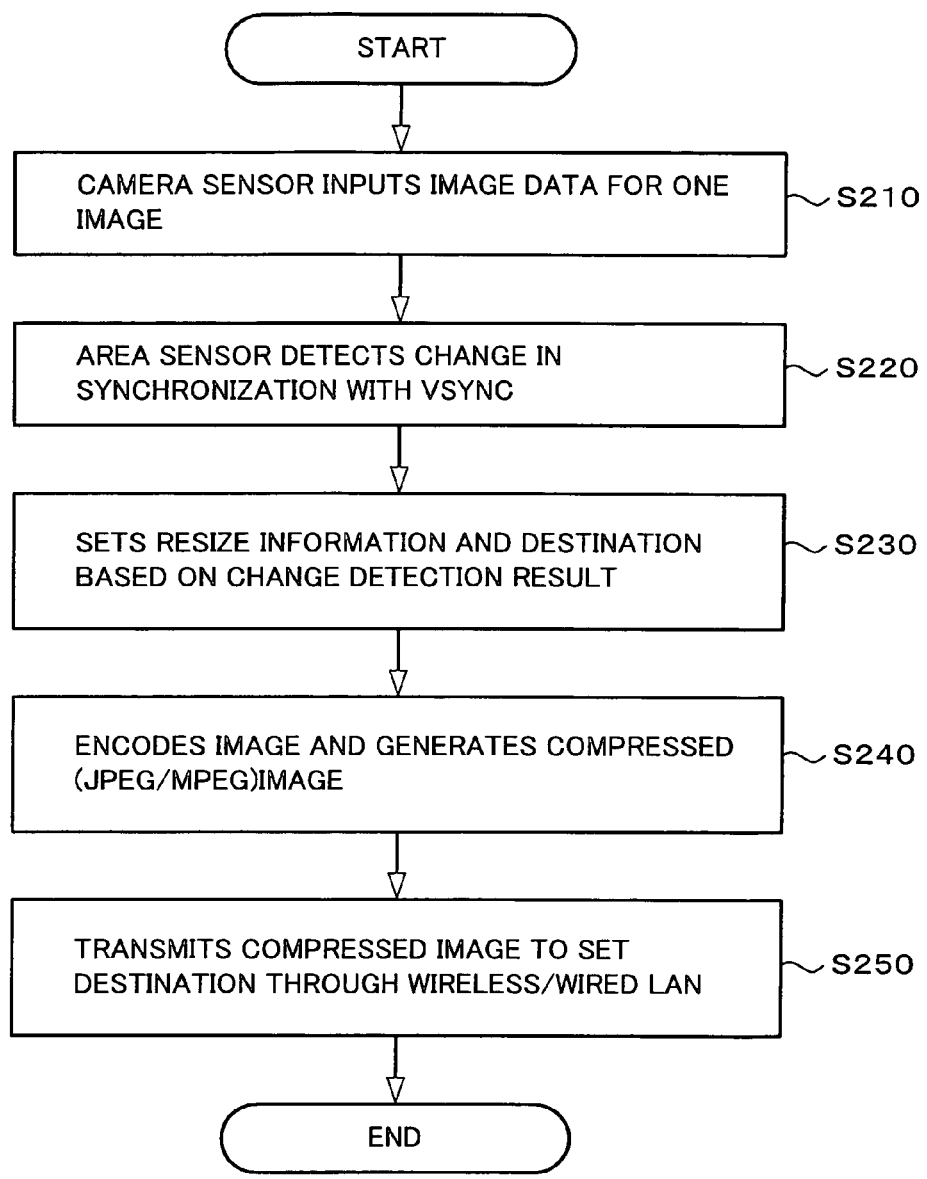
FIG. 4 is a flowchart illustrative of a flow of processing according to one embodiment of the invention.

FIG. 4 is a flowchart illustrative of the flow of the processing according to this embodiment.

The camera sensor inputs image data of one image (step S210).

The area sensor detects a change in area units in synchronization with the vertical synchronization signal VSYNC (step S220).

The resize information and the destination are set based on the change detection result (step S230).

The image is encoded and a compressed (JPEG/MPEG) image is generated (step S240).

Figure 5:
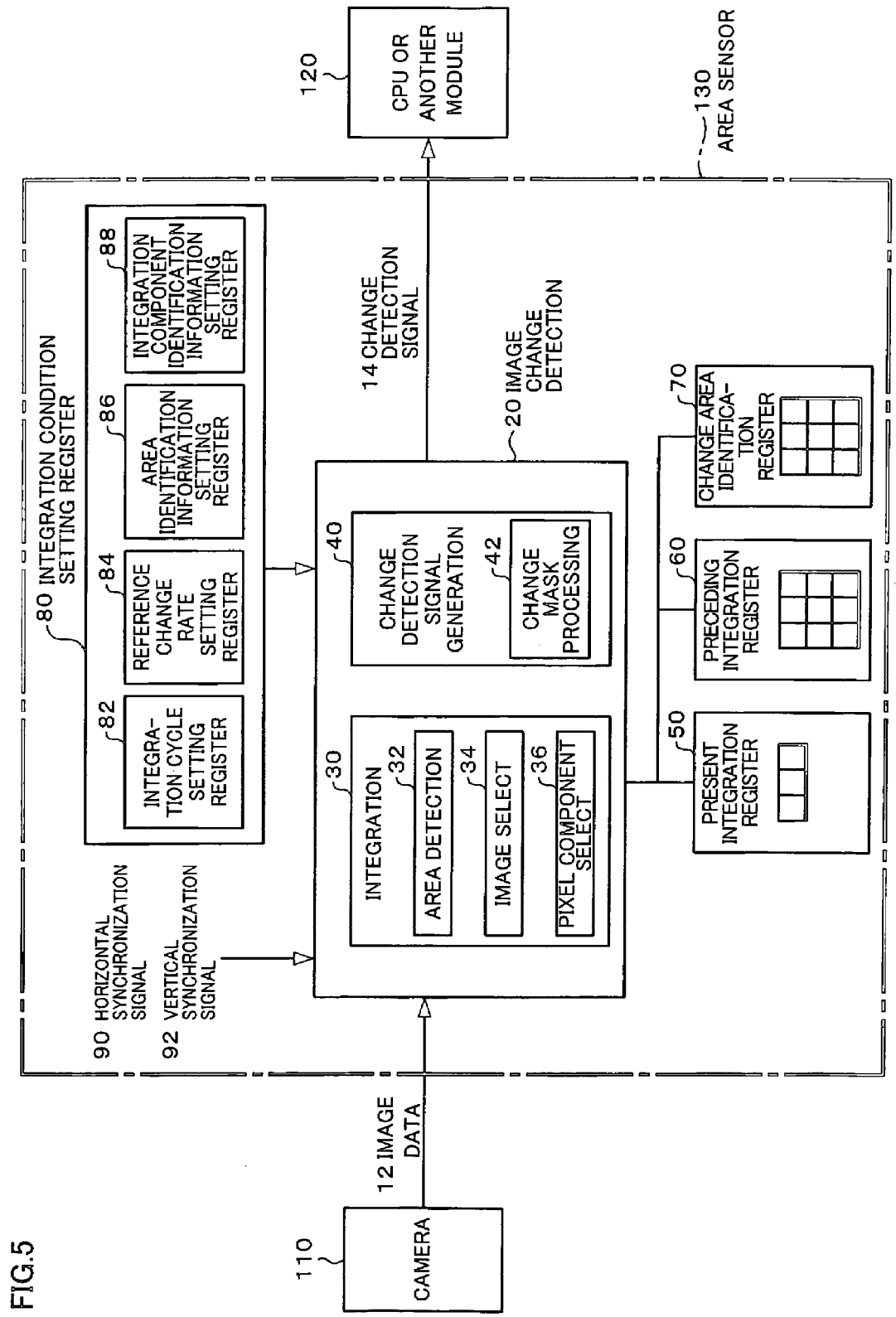
FIG. 5 is a block diagram of an area sensor according to one embodiment of the invention.

FIG. 5 shows an example of a block diagram of the area sensor 130 according to this embodiment.

The area sensor 130 according to this embodiment includes an image change detection circuit 20 which receives pixel-unit image data 12 captured by the imaging means such as the camera 110 in time series, detects a change in the image, and generates a change detection signal 14.

The image change detection circuit 20 includes an integration circuit 30 which sets one ore more areas in an image, integrates pixel values (or values relating to luminance) of pixels belonging to each area of image data of a first image and a second image received in time series in area units, and holds the resulting integrated values in integration registers 50 and 60.

The image change detection circuit 20 includes a change detection signal generation circuit 40 which compares the integrated values of corresponding areas of the first image and the second image held in the integration registers 50 and 60 to detect whether or not a change has occurred, and generates the change detection signal when the change detection signal generation circuit 40 has determined that a change has occurred.

The image change detection circuit 20 includes the integration registers 50 and 60 which hold the area-unit integrated values of the image data of the first image and the second image received in time series. For example, the area-unit integrated value of the pixel values of the first image data may be held in the integration register 50, and the integrated value held in the integration register 50 may then be transferred to the second integration register 60. The area-unit integrated value of the image data of the second image received after the first image may be held in the integration register 50, and the integrated values of corresponding areas of the first image and the second image held in the integration registers 50 and 60 may be compared to detect whether or not a change has occurred.

The integration circuit 30 may divide an image into a plurality of areas, integrate the pixel values (or values relating to luminance) of the pixels belonging to each area of the image data of the first image and the second image received in time series in area units, and hold the resulting integrated values in the integration registers 50 and 60. The change detection signal generation circuit 40 may compare the integrated values of corresponding areas of the first image and the second image held in the integration registers 50 and 60 to detect whether or not a change has occurred, and generate the change detection signal 14 when the change detection signal generation circuit 40 has determined that a change has occurred.

The image change detection circuit 20 may be configured to include a change area identification register 70. The change detection signal generation circuit 40 may compare the integrated values of corresponding areas of the first image and the second image held in the integration registers 50 and 60 to detect whether or not a change has occurred, and hold the evidence of whether or not a change has occurred in each area in the change area identification register 70.

The image change detection circuit 20 may be configured to include an integration cycle setting register 82 in which an integration cycle is set. The integration circuit 30 may be configured to include an image select section 34 which specifies the integration cycle based on the value set in the integration cycle setting register 82 and determines whether or not the received image data 12 coincides with the specified integration cycle. The integration circuit 30 may integrate the pixel values (or values relating to luminance) of the pixels belonging to each area of the image data 12 which coincides with the integration cycle in area units, and hold the resulting integrated values in the integration registers 50 and 60.

The image change detection circuit 20 may include a reference change rate setting register 84 in which a reference change rate used as a reference when detecting a change is set. The change detection signal generation circuit 40 may specify the reference change rate based on the value set in the reference change rate setting register 84, compare the integrated values of corresponding areas of the first image and the second image held in the integration registers 50 and 60, and detect whether or not a change has occurred based on the reference change rate.

The image change detection circuit 20 may include an area identification information setting register 86 in which area identification information for specifying the change detection target area is set. The change detection signal generation circuit 40 may include a change mask processing section 42 which determines whether or nor the area is the detection target area based on the value set in the area identification information setting register 86, and does not generate the change detection signal when the area is not the detection target area.

The image change detection circuit 20 may include an integration component identification information setting register 88 in which integration component identification information for specifying the integration target component of the pixel values is set. The integration circuit 30 may select the pixel component based on the value set in the integration component identification information setting register 88, and integrate the selected pixel components of the image data.

The integration circuit 30 may include an area detection section 32 which receives a horizontal synchronization signal 90 and a vertical synchronization signal 92 and determines the area to which each pixel belongs based on the received horizontal synchronization signal 90 and vertical synchronization signal 92, the number of horizontal divisions, and the number of vertical divisions.

An image may be divided into "m" areas in the horizontal direction and into "n" areas in the vertical direction to provide "n×m" divided areas. The image change detection circuit 20 may include the present integration register 50 for holding "m×n" integrated values, and the preceding integration register 60 for holding "m×n" integrated values. After the integration circuit 30 has stored the integrated value of the image data of the second image in the present integration register 50, the change detection signal generation circuit 40 may compare the integrated value held in the present integration register with the corresponding integrated value held in the preceding integration register in which the integrated value of the image data of the first image is held to detect whether or not a change has occurred, and transfer the integrated value held in the present integration register to the preceding integration register after the comparison.

An image may be divided into "m" areas in the horizontal direction and into "n" areas in the vertical direction to provide "n×m" divided areas (m and n are natural numbers). The image change detection circuit 20 may include the present integration register for holding "m" integrated values, and the preceding integration register for holding "m×n" integrated values. After the integration circuit 30 has stored the integrated values of the second image for "n" areas in the horizontal direction in the present integration register 50, the change detection signal generation circuit 40 may compare the integrated value held in the present integration register 50 with the corresponding integrated value held in the preceding integration register 60 in which the integrated value of the image data of the first image is held to detect whether or not a change has occurred, and transfer the integrated value held in the present integration register to the preceding integration register after the comparison.

FIG. 6 is a diagram illustrative of the area-unit pixel value integration according to this embodiment.

Reference numerals 210 and 212 respectively indicate the first image and the second image input in time series. In this embodiment, the first image 210 and the second image 212 are divided into a plurality of areas in the same division pattern. In FIG. 6, each image is divided into nine (=3×3) areas by equally dividing the image into three in the horizontal direction and into three in the vertical direction.

For example, a given area 220 of the first image is made up of "n" (=m1×m2) pixels P1, P2, ..., Pn, and the pixel values of the pixels P1, P2, ..., Pn are respectively a1, a2, ..., an. The pixel values a1, a2, ..., an may be the values of one component of the YUV components or the RGB components, for example.

In this case, when the integrated value of the pixel values of an area A1 of the first image is As1, the integrated value As1 may be expressed by the following equation, for example.

$$As1 = a1 + a2 + \ldots + an$$

An integrated value Ad1' may be calculated by integrating values a1', a2', ..., an' of higher-order bits of the pixel values a1, a2, ..., an.

Likewise, a given area 222 of the second image is made up of "n" (=m1×m2) pixels P1, P2, ..., Pn, and the pixel values of the pixels P1, P2, ..., Pn are respectively b1, b2, ..., bn, for example. The pixel values b1, b2, ..., bn may be the values of one component of the YUV components or the RGB components (provided that the component is the same as that of the pixel values a1, a2, ..., an).

In this case, when the integrated value of the pixel values of an area B1 of the second image is Bs1, the integrated value Bs1 may be expressed by the following equation, for example.

$$Bs1 = b1 + b2 + \ldots + bn$$

An integrated value Bs1' may be calculated by integrating values b1', b2', ..., bn' of higher-order bits of the pixel values b1, b2, ..., bn.

In this embodiment, the integrated values (e.g. As1 and Bs1) are compared in area units to detect whether or not a change has occurred. A condition relating to the reference change rate used as the reference when detecting a change may be set in the reference change rate setting register, and the integrated values of corresponding areas of the first image and the second image held in the integration registers may be compared based on the reference change rate to detect whether or not a change has occurred. The reference change rate may be set by the change ratio with respect to the entire image or the like. For example, when the reference change rate is set at h %, it is determined that a change has occurred (change is detected) when the value "(Bs1−As1)/As1" (change rate) is equal to or greater than h %. When the reference change rate h1 is smaller than the reference change rate h2, the change detection sensitivity is increased by employing the reference change rate h1 rather than the reference change rate h2. Therefore, it is preferable to set the reference change rate depending on the application of the monitoring camera or the like, the conditions of the imaging location, and the like.

For example, a plurality of reference change rates (e.g. first reference change rate: 3 to 6%, second reference change rate: 3%, and third reference change rate: 25%) may be provided in advance, and one of the reference change rates may be selectively set.

Nine integration registers may be provided for holding the integrated values As1 to As9 of the areas A1 to A9 of the first image, and nine integration registers may be provided for holding the integrated values Bs1 to Bs9 of the areas B1 to B9 of the second image.

The integration target values may be higher-order bits of each pixel value, for example. For example, higher-order five bits of the pixel values may be integrated so that the integration register has a 24-bit configuration. The hardware scale can be reduced by using higher-order bits of each pixel value as the integration target values.

FIG. 7 is a flowchart illustrative of an example of image change detection processing according to this embodiment.

A value for specifying the integration condition (e.g. integration cycle, change rate, YUV selection, and area selection) is set in the integration condition setting register (step S10).

The YUV components of each pixel of the input image data of the first image and the second image are temporarily integrated into the integration registers (present integration register and preceding integration register) (step S20).

The value held in the present integration register and the corresponding value held in the preceding integration register are compared while switching the YUV selection to select the component allowing a wider dynamic range (step S30).

The input data starts to be received (step S40).

Whether or not the input image data is the image data in the integration cycle is determined. When the input image data is the image data in the integration cycle, the selected components (may be higher-order bits) of each pixel are integrated in area units, and the integrated value is held in the integration register (present integration register) (step S50).

Whether or not the integration processing has been completed for the image data of one image is determined (step S60). When the integration processing has not been completed, the processing in the step S50 is performed again. When the integration processing has been completed, the following processing is performed.

Specifically, the integrated values of corresponding areas of the first image and the second image held in the integration registers are compared to detect whether or not a change has occurred, and the evidence of whether or not a change has occurred is held in the change area identification register in area units (step S70).

When a change has occurred in one of the areas (step S80), an area sensor interrupt is generated, and the change detection signal is generated and output to activate the CPU or another module (step S90).

The CPU or another module reads data from an area detection register, and then clears the area detection register (step S100).

When the processing is not finished, the processing in the step S50 is performed again (step S110).

Figure 8A:
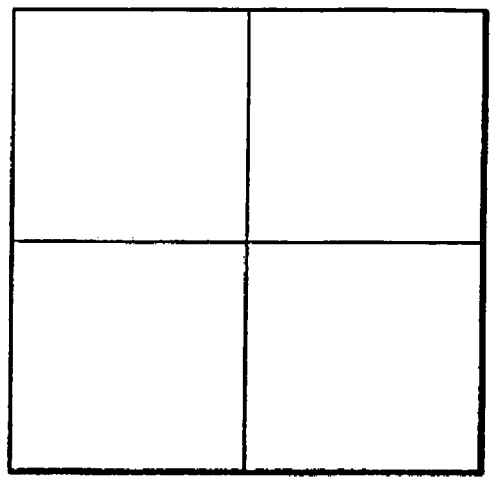
FIGS. 8A to 8C are diagrams illustrative of image area division patterns according to one embodiment of the invention.
Figure 8B:
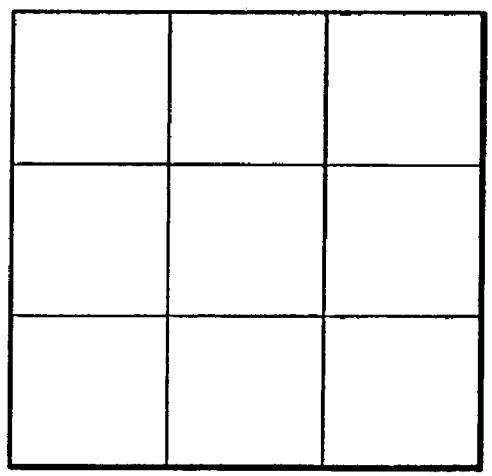
Figure 8C:
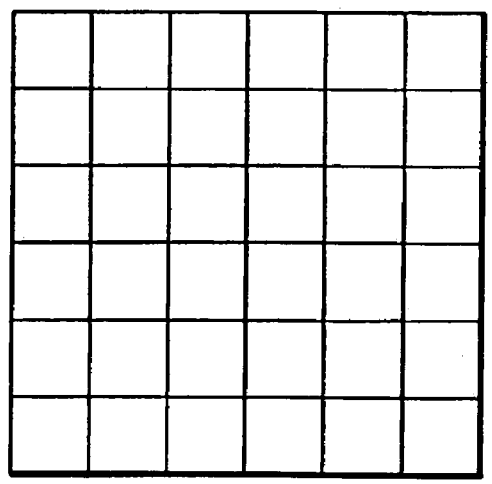

FIGS. 8A to 8C are diagrams illustrative of image area division patterns according to this embodiment.

FIG. 8A shows a first division pattern in which the image is divided into four areas (quadrilateral (large) areas) by dividing the image into two areas in the horizontal direction and into two areas in the vertical direction. FIG. 8B shows a second division pattern in which the image is divided into nine areas (quadrilateral (medium) areas) by dividing the image into three areas in the horizontal direction and into three areas in the vertical direction. FIG. 8C shows a third division pattern in which the image is divided into 36 areas (quadrilateral (small) areas) by dividing the image into six areas in the horizontal direction and into six areas in the vertical direction.

The division pattern may be set and changed by external input.

When checking whether or not the image has been changed by detecting a change in the integrated value of each area, a change can be more accurately detected by dividing the image into smaller areas. Specifically, a change can be accurately detected in the order from the third division pattern, the second division pattern, and the first division pattern.

The change detection sensitivity can be changed by changing the number of area divisions (changing the size of each area). For example, the change detection sensitivity can be increased by increasing the number of area divisions (reducing the size of each area).

However, since the circuit scale is increased as the image is divided into smaller areas, it is preferable to set the number of area divisions depending on the objective of the monitoring camera or the like, the setting conditions, and the like.

FIGS. 9A and 9B are diagrams illustrative of the integration cycle according to this embodiment.

FIG. 9A shows integration target images when the integration cycle is 1/20 sec. The reference numerals 310-1, 310-2, . . . indicate the time-series images g1, g11, . . . sent from the imaging means such as the monitoring camera. The image g1 is an image in the first frame, the image g11 is an image in the eleventh frame, and the image gn is an image in the nth frame. In the case where images are captured in units of 1/60 sec, the images are subjected to integration at intervals of 20 frames when the integration cycle is 1/20 sec. In FIG. 9A, the image g1 (310-1), the image g21 (310-3), . . . are used as the integration-comparison targets, and the remaining images received between these images are not used as the integration-comparison targets.

FIG. 9B shows integration target images when the integration cycle is 1/60 sec. The reference numerals 310-1, 310-2, . . . indicate the time-series images g1, g11, . . . sent from the imaging means such as the monitoring camera. The image g1 is an image in the first frame, the image g11 is an image in the eleventh frame, and the image gn is an image in the nth frame. In the case where images are captured in units of 1/60 sec, the images are subjected to integration at intervals of 60 frames when the integration cycle is 1/60 sec. In FIG. 9B, the image g1 (310-1), the image g61 (310-3), . . . are used as the integration-comparison targets, and the remaining images received between these images are not used as the integration-comparison targets.

According to this embodiment, the image pick-up cycle for change detection can be changed by altering the value set in the integration cycle setting register. A quick change can be detected by reducing the integration cycle, and a slow change can be detected by increasing the integration cycle. Therefore, it is preferable to set the area division depending on the objective.

Figure 10A:
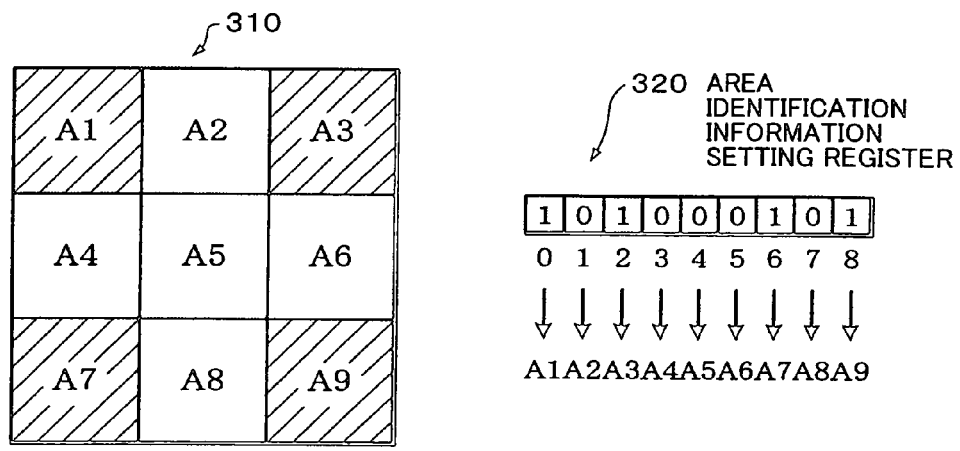
FIGS. 10A and 10B are diagrams illustrative of change detection target areas.
Figure 10B:
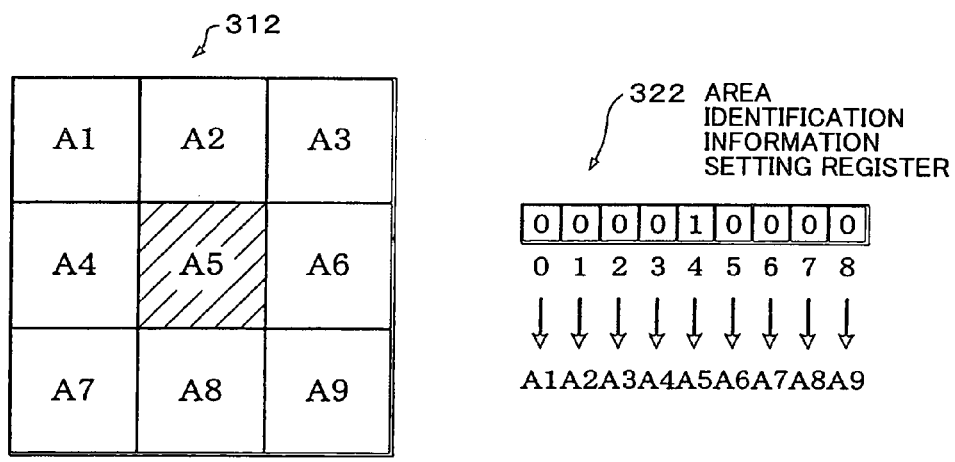

FIGS. 10A and 10B are diagrams illustrative of change detection target areas.

A reference numeral 320 in FIG. 10A indicates that the image is divided into nine areas A1 to A9 and the areas A1, A3, A7, and A9 are set as the change detection targets. The reference numeral 320 indicates the contents of the area identification information setting register. The area identification information setting register having at least nine bits is provided when the image is divided into nine areas. Each bit of the area identification information setting register is associated with each area (bits 0 to 8 of the area identification information setting register respectively correspond to the areas A1 to A9 in FIG. 10A), and whether or not the corresponding area is the detection target is set by setting each bit to ON or OFF.

In FIG. 1A, since the areas A1, A3, A7, and A9 are set as the change detection targets, the corresponding bits 0, 2, 6, and 8 of the area identification information setting register are set at "1", and the remaining bits are set at "0".

According to this configuration, the CPU or the like can be notified of a change using an interrupt or the like only when a change has occurred in the areas A1, A3, A7, and A9 as the change detection targets.

For example, a change occurring in the areas A2, A4, A5, A6, and A8 can be masked when it is unnecessary to detect a change since a change always occurs in the areas A2, A4, A5, A6, and A8.

A reference numeral 322 in FIG. 10B indicates that the image is divided into nine areas A1 to A9 and the area A5 is set as the change detection target. The reference numeral 322 indicates the contents of the area identification information setting register.

In FIG. 10B, since the area A5 is set as the change detection target, the corresponding bit 4 of the area identification information setting register is set at "1", and the remaining bits are set at "0".

According to this configuration, the CPU or the like can be notified of a change using an interrupt or the like only when a change has occurred in the area A5 as the change detection target.

For example, when a door, window, or the like exists in the area A5 and it suffices to detect only a change occurring near the door or window, a change occurring in the areas other than the area A1 can be masked.

According to this embodiment, the CPU or the like can be notified of a change only when a change has occurred in the detection target area. There may be a case where it is unnecessary to detect a change occurring in a certain area depending on the imaging conditions since the image is always changed in this area. According to the invention, since change detection of such an area can be masked, it is possible to efficiently detect a change occurring in a particular area.

Figure 11A:
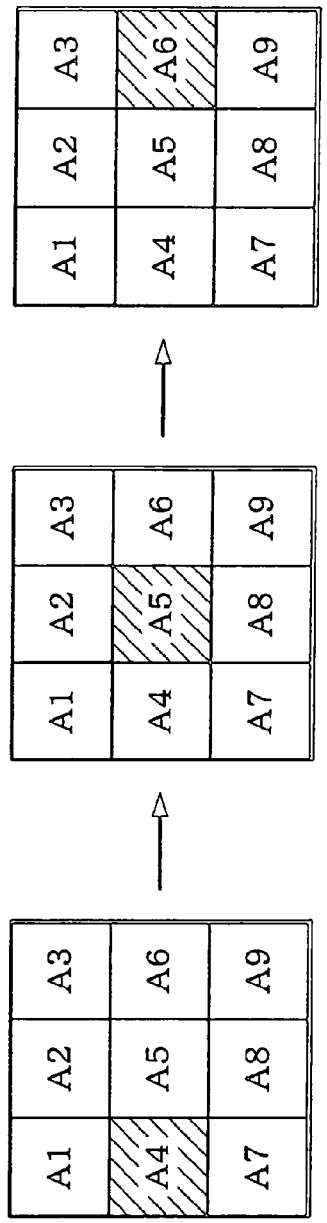
FIGS. 11A and 11B are diagrams illustrative of position detection according to one embodiment of the invention.
Figure 11B:
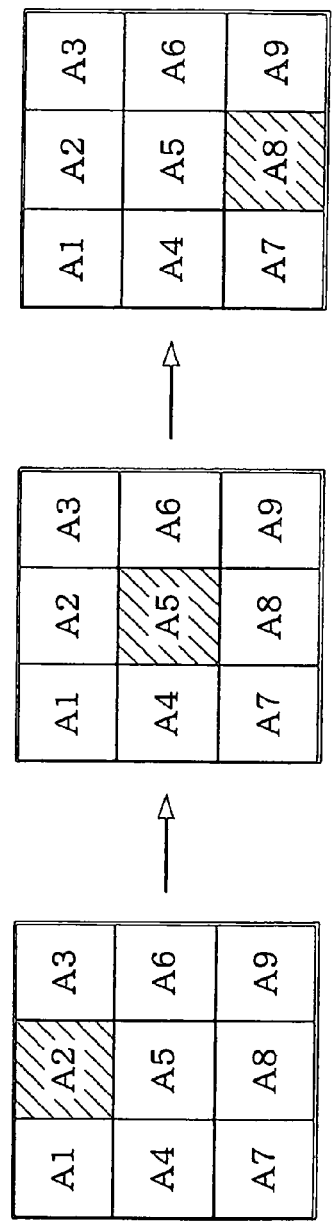

FIGS. 11A and 11B are diagrams illustrative of position detection according to this embodiment.

FIG. 11A shows a state in which the image is divided into nine areas A1 to A9 and the area, in which a change has been detected, changes in the order of A4→A5→A6. In this case, it is estimated that something has moved from the left to the right near the center of the image.

FIG. 11B shows a state in which the image is divided into nine areas A1 to A9 and the area, in which a change has been detected, changes in the order of A2→A5→A8. In this case, it is estimated that something has moved from the top to the bottom near the center of the image.

According to this embodiment, since the change moving direction can be determined by reading the areas in which a change has been detected in time series, simple movement detection can also be performed.

Figure 12:
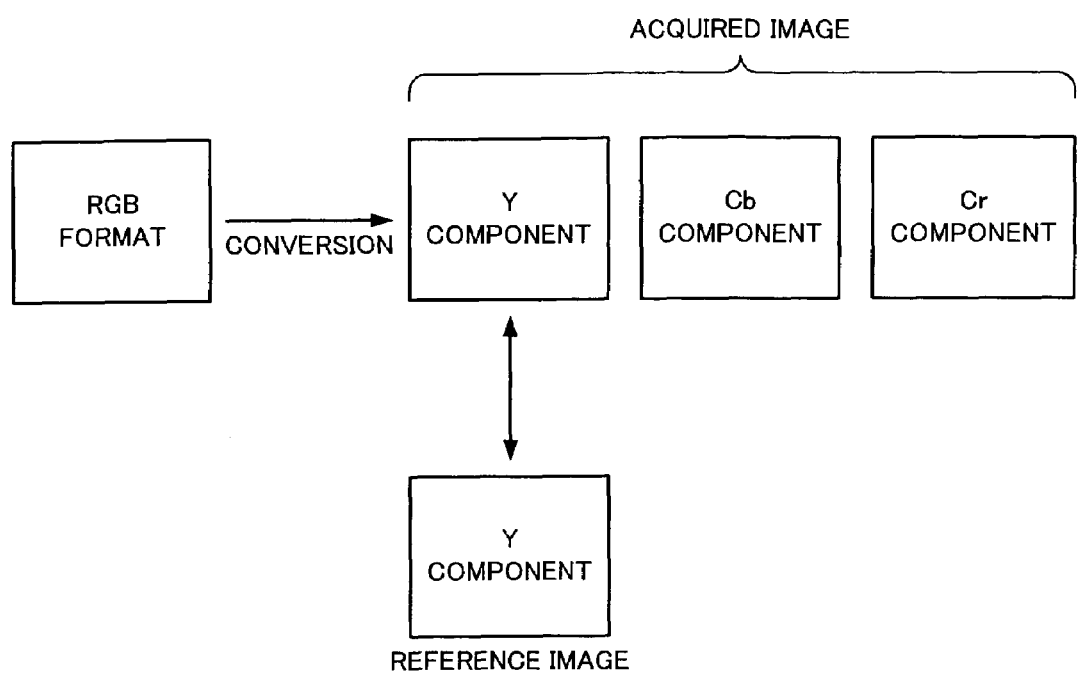
FIG. 12 is a diagram illustrative of a pixel value used in one embodiment of the invention.

FIG. 12 is a diagram illustrative of the pixel value used in this embodiment.

When using YUV data as the pixel value information, the Y component data of each pixel may be utilized.

The following description is given on the assumption that the image data received from the imaging means is image data in the RGB format. Note that the invention is not limited thereto. In the image data in the RGB format, each pixel is expressed by RGB primary color signals.

The acquired image data in the RGB format is converted into image data made up of the Y component (luminance component), the Cb component, and the Cr component. The image change detection section performs the change detection processing by integrating the Y components of the acquired image data.

A reduction in the amount of data and a reduction in the processing load can be achieved by extracting only the luminance component and performing the change detection processing based on the luminance component.

The invention is not limited to the above-described embodiments, and various modifications can be made within the scope of the invention.

Although only some embodiments of the invention have been described in detail above, those skilled in the art will readily appreciate that many modifications are possible in the embodiments without departing from the novel teachings and advantages of this invention. Accordingly, all such modifications are intended to be included within the scope of this invention.

The entire disclosure of Japanese Patent Application No. 2005-142779, filed May 16, 2005 is expressly incorporated by reference herein.

What is claimed is:

1. An integrated circuit device having a transmitter function for transmitting data to outside through a network, the integrated circuit device comprising:
   an image change detection circuit which receives pixel-unit image data captured by imaging means in time series, divides an image represented by the image data into a plurality of areas, and detects in real time whether or not a change has occurred in each of the plurality of areas to generate a change detection signal; and
   a destination set/change section which sets or changes a destination of the image based on the change detection signal.

2. The integrated circuit device as defined in claim 1, wherein the destination set/change section sets a first destination as the destination of the image when the change detection signal indicates that a change of the image has not been detected in any of the areas, and sets a second destination differing from the first destination as the destination of the image when the change detection signal indicates that a change of the image has been detected in at least one of the areas.

3. The integrated circuit device as defined in claim 1, wherein the destination set/change section assigns a destination address to successively acquired images according to a given rule, determines the assigned destination address as the destination of the image when a change of the image has been detected in at least one of the areas, and determines a default destination address provided in advance as the destination of the image when a change of the image has not been detected in any of the areas.

4. The integrated circuit device as defined in claim 1, further comprising:
   a resize information determination section which determines resize information indicating at least one of a transmitted data size and a transmitter position, based on the change detection signal or the destination of the image set or changed based on the change detection signal; and
   a resize circuit which scales down or cuts out the image represented by the pixel-unit image data received in time series, based on the resize information.

5. The integrated circuit device as defined in claim 2, further comprising:
   a resize information determination section which determines resize information indicating at least one of a transmitted data size and a transmitter position, based on the change detection signal or the destination of the image set or changed based on the change detection signal; and
   a resize circuit which scales down or cuts out the image represented by the pixel-unit image data received in time series, based on the resize information.

6. The integrated circuit device as defined in claim 3, further comprising:
   a resize information determination section which determines resize information indicating at least one of a transmitted data size and a transmitter position, based on the change detection signal or the destination of the image set or changed based on the change detection signal; and
   a resize circuit which scales down or cuts out the image represented by the pixel-unit image data received in time series, based on the resize information.

7. The integrated circuit device as defined in claim 4, wherein the resize information determination section generates the resize information which directs to scale down the image represented by the pixel-unit image data received in time series when the change detection signal indicates that a change of the image has not occurred in any of the areas; and
   wherein the resize circuit scales down the image represented by the pixel unit image data received in time series, based on the resize information.

8. The integrated circuit device as defined in claim 4, wherein, when the change detection signal indicates that a change has occurred in the image represented by the pixel-unit image data received in time series, the resize information determination section generates the resize information which directs to cut out at least one of the areas in which the change of the image has been detected; and
   wherein the resize circuit cuts out at least one of the areas in which the change of the image has been detected, based on the resize information.

9. The integrated circuit device as defined in claim 7, wherein, when the change detection signal indicates that a change has occurred in the image represented by the pixel-unit image data received in time series, the resize information determination section generates the resize information which directs to cut out at least one of the areas in which the change of the image has been detected; and
   wherein the resize circuit cuts out at least one of the areas in which the change of the image has been detected, based on the resize information.

10. A microcomputer, comprising the integrated circuit device as defined in claim 1.

11. A microcomputer, comprising the integrated circuit device as defined in claim 2.

12. A microcomputer, comprising the integrated circuit device as defined in claim 3.

13. A microcomputer, comprising the integrated circuit device as defined in claim 4.

14. A monitoring camera system having a monitoring camera device which includes the microcomputer as defined in claim 10 and an imaging device, and a plurality of terminals connected to the monitoring camera device through a network, wherein the monitoring camera device sets one or more areas in an image captured by the imaging device, determines a destination terminal, a size and a position of the image based on at least either whether or not a change of the image has occurred or in which of the areas a change of the image has been detected, acquires the image based on the determined size and position, compresses the acquired image, and transmits the compressed image to the determined destination terminal through the network.

15. A monitoring camera system having a monitoring camera device which includes the microcomputer as defined in claim 11 and an imaging device, and a plurality of terminals connected to the monitoring camera device through a network, wherein the monitoring camera device sets one or more areas in an image captured by the imaging device, determines a destination terminal, a size and a position of the image based on at least either whether or not a change of the image has occurred or in which of the areas a change of the image has been detected, acquires the image based on the determined size and position, compresses the acquired image, and transmits the compressed image to the determined destination terminal through the network.

16. A monitoring camera system having a monitoring camera device which includes the microcomputer as defined in claim 12 and an imaging device, and a plurality of terminals connected to the monitoring camera device through a network, wherein the monitoring camera device sets one or more areas in an image captured by the imaging device, determines a destination terminal, a size and a position of the image based on at least either whether or not a change of the image has occurred or in which of the areas a change of the image has been detected, acquires the image based on the determined size and position, compresses the acquired image, and transmits the compressed image to the determined destination terminal through the network.

17. A monitoring camera system having a monitoring camera device which includes the microcomputer as defined in claim 13 and an imaging device, and a plurality of terminals connected to the monitoring camera device through a network, wherein the monitoring camera device sets one or more areas in an image captured by the imaging device, determines a destination terminal, a size and a position of the image based on at least either whether or not a change of the image has occurred or in which of the areas a change of the image has been detected, acquires the image based on the determined size and position, compresses the acquired image, and transmits the compressed image to the determined destination terminal through the network.

18. An integrated circuit comprising: an image change detection circuit that receives a plurality of image data captured by image means and displayed on a monitor, the plurality of image data including a first image data and a second image data that is displayed on the monitor after the first image data, each of the first image data and the second image data including a first image region and a second image region, detects in real time whether or not a change has occurred between the first image region of the first image data and the first image region of the second image data, and detects in real time whether or not a change has occurred between the second image region of the first image data and the second image region of the second image data to generate a change detection signal; and a destination set/change section which sets or changes a destination of the plurality of image data based on the change detection signal.

19. An integrated circuit comprising:

an image change detection circuit that receives a plurality of image data captured by image means and displayed on a monitor, the plurality of image data including a first image data and a second image data that is displayed on the monitor after the first image data, each of the first image data and the second image data including a given image region, detects in real time whether or not a change has occurred between the given image region of the first image data and the given image region of the second image data, and detects in real time whether or not a change has occurred between the given image region of the first image data and the given image region of the second image data to generate a change detection signal; and a destination set/change section which sets or changes a destination of the plurality of image data based on the change detection signal.

* * * * *